UNITED STATES PATENT OFFICE.

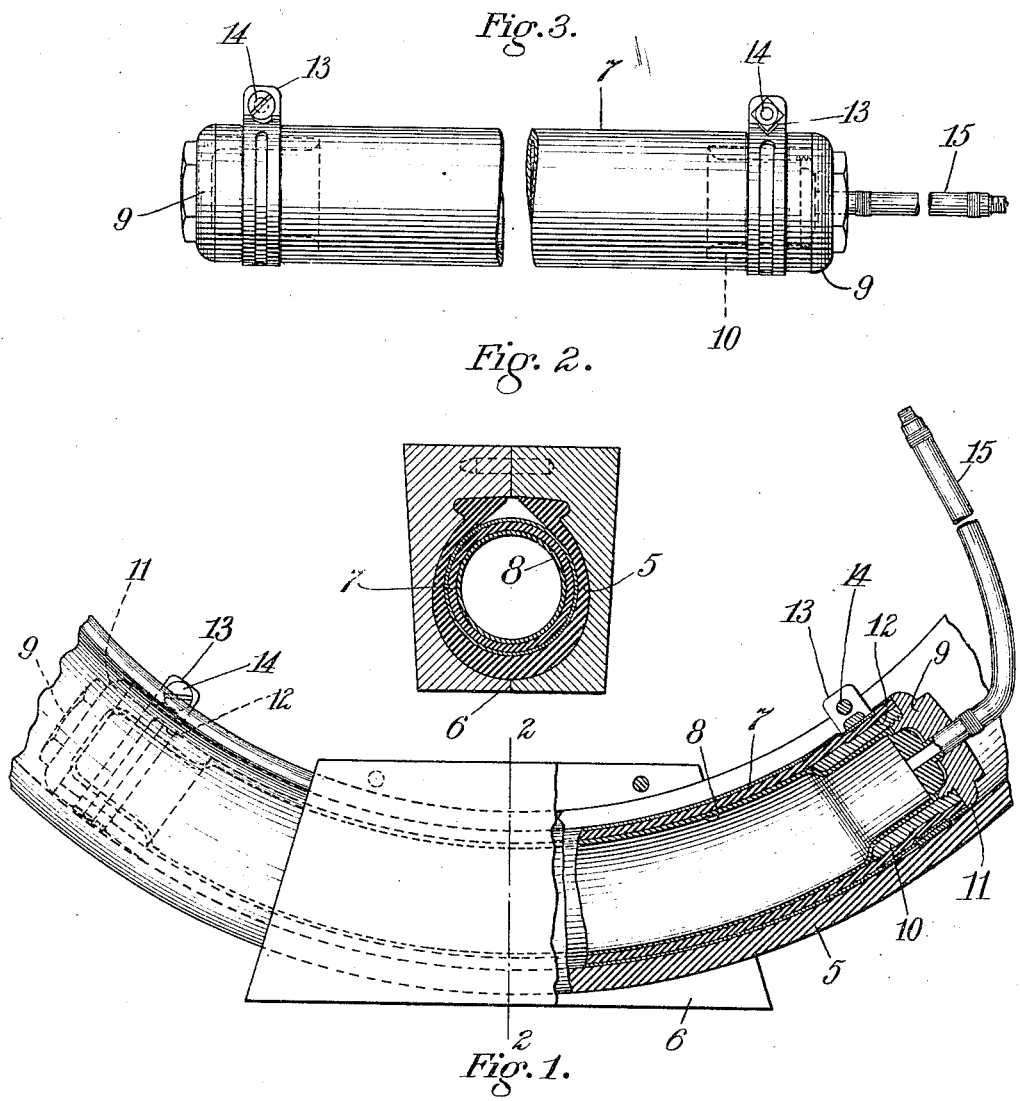

FREDERICK A. BLANCHARD, OF NORFOLK DOWNS, MASSACHUSETTS, ASSIGNOR OF ONE-HALF TO ALFRED L. BLANCHARD, OF NORFOLK DOWNS, MASSACHUSETTS.

TIRE-REPAIR-VULCANIZING DEVICE.

966,302.     Specification of Letters Patent.     Patented Aug. 2, 1910.

Application filed September 24, 1908. Serial No. 454,586.

*To all whom it may concern:*

Be it known that I, FREDERICK A. BLANCHARD, a citizen of the United States, residing at Norfolk Downs, in the county of Norfolk and State of Massachusetts, have invented new and useful Improvements in Tire-Repair-Vulcanizing Devices, of which the following is a specification.

This invention relates to improvements in tire repair vulcanizing devices, and the object is to effect improvements in the air bag, so called, which is placed in the tire and which is inflated after the tire has been placed in a mold for vulcanizing a repaired portion of the tire. Air bags at present in use are constructed entirely of fabric and rubber and when so constructed are very apt to leak and blow out at the ends, and in addition leaks very often develop between the ends. After such failure of the air bag it is practically impossible to repair the same so that it shall be sufficiently strong and durable and the result is that the air bag must be thrown away and replaced by a new one.

The object of my invention is to provide a stronger and more durable air bag than has heretofore been employed and in the attainment of this object I have provided an air bag having caps, preferably formed of metal, inserted in the ends of the bag and detachably secured therein by suitable means and providing a removable inner tube which may be removed through one end, repaired and then replaced.

Another object of my invention is to provide a device of the class described in which the air bag shall, by its construction, be adaptable to tires of any diameter.

The invention consists in the combination and arrangement of parts set forth in the following specification and particularly pointed out in the appended claims.

Referring to the drawing: Figure 1 is a side elevation, partly broken away and shown partly in section, of a vulcanizing device embodying my invention, a tire being shown in the mold and an air bag in the tire. Fig. 2 is a section taken on line 2—2 of Fig. 1. Fig. 3 is an elevation of the air bag, partly broken away to save space, the inflating tube being also partly broken away.

Like numerals refer to like parts throughout the views of the drawing.

In the drawing, 5 is the shoe of a tire which because of a cut or so-called blow-out it has become necessary to repair by filling the hole with plastic rubber and vulcanizing the same in a well known manner. The tire is placed in a mold 6 formed in two parts which may be connected to each other in any suitable or desired manner and which may be surrounded by any suitable means for supplying the necessary heat for the vulcanizing. In the tire shoe 5 is an air bag which comprises a hollow cylindrical receptacle 7 which in practice is made up of properly arranged layers of fabric and rubber, said receptacle comprising a separate inner tube 8 formed with integral ends. In the ends of the receptacle 7 are located caps 9 preferably formed of metal, each of said caps being preferably formed in two parts, namely, a cylindrical shell 10 having screw-threaded engagement with an end plate 11, said caps being of the proper diameter to tightly fit the interior of the outer tube of the receptacle 7. Each of the caps 9 is provided with an annular groove 12 and in alinement with these grooves, respectively, are clamp bands or collars 13 encircling the receptacle 7.

The collars 13 may be caused to tightly grip the receptacle 7 by means of bolts 14 14, which when tightened up to the proper extent force a part of the receptacle into the groove 12 and thus the caps 9 are prevented from blowing out when the bag is inflated and leakage of air between said caps and the receptacle 7 is prevented. To one end of the inner tube 8 is secured a flexible tube 15 which passes through a suitable hole formed in the end plate 11 and which may be connected to a pump to supply compressed air thereto, whereby the air bag may be inflated and the tire shoe 5 forced against the walls of the mold 6.

It will be understood that in vulcanizing it is necessary that the parts to be vulcanized shall be held under compression, and to that end it is necessary to subject the air bag to considerable internal air pressure to effect the desired result. By this method of constructing the ends of the air bag not only is leakage through the ends done away with, but if at any time the intermediate portion of the air bag should leak and require repairing this may be easily accomplished by either unscrewing the end plates 11 or entirely removing the caps. In practice it is found desirable to remove only the end plates. One of the end plates having been removed, the inner tube 8 may then be withdrawn, repaired and replaced.

By having the caps 9 entirely distinct and independent of each other the bag is rendered entirely flexible therebetween and is capable of adapting itself to tires of any diameter.

Having thus described my invention, what I claim and desire by Letters Patent to secure is:

1. The combination in a device of the class described, of means adapted to engage the exterior of a tire, and a receptacle adapted to be placed in said tire, said receptacle comprising a flexible outer tube having apertures in its ends, a flexible inner tube contacting with said outer tube along its central portion, and two distinct and independent closures extending across said apertures and detachably attached to opposite ends, respectively, of said outer tube.

2. The combination in a device of the class described, of means adapted to engage the exterior of a tire, a substantially cylindrical flexible receptacle adapted to be placed in said tire, a flexible inner tube located in said receptacle and contacting therewith along its central portion, and a cap located in one end of said receptacle to close the same, said cap comprising a cylindrical shell fast to said receptacle and an end plate detachably attached to said shell whereby said inner tube may be removed therethrough, said receptacle and tube being adapted to be inflated whereby said tire may be compressed between said means and said receptacle.

In testimony whereof I have hereunto set my hand in presence of two subscribing witnesses.

FREDERICK A. BLANCHARD.

Witnesses:
  Louis A. Jones,
  Sadie V. McCarthy.